(12) United States Patent
Corbishley

(10) Patent No.: US 7,622,683 B2
(45) Date of Patent: Nov. 24, 2009

(54) MARINE AND SUBMARINE PIPELINES

(76) Inventor: Terry Jeffrey Corbishley, Firstone, 2 Guards Road, Lindal-In-Furness, Ulverston, Cumbria, LA12 OTN (GB)

( * ) Notice: Subject to any disclaimer, the term of this patent is extended or adjusted under 35 U.S.C. 154(b) by 74 days.

(21) Appl. No.: 10/898,205

(22) Filed: Jul. 26, 2004

(65) Prior Publication Data

US 2006/0016617 A1  Jan. 26, 2006

(51) Int. Cl.
*H01B 17/00* (2006.01)

(52) U.S. Cl. ............... 174/137 R; 174/149 R; 174/135; 138/149; 138/156

(58) Field of Classification Search ........... 138/149, 138/140, 156, 157; 174/135, 149 R
See application file for complete search history.

(56) References Cited

U.S. PATENT DOCUMENTS

| 3,388,724 | A | * | 6/1968 | Mascenik et al. | 138/149 |
| 4,590,971 | A | * | 5/1986 | Webster et al. | 138/149 |
| 5,795,102 | A | * | 8/1998 | Corbishley | 405/171 |
| 6,213,157 | B1 | * | 4/2001 | Thiebaud et al. | 138/149 |

* cited by examiner

*Primary Examiner*—Dhiru R Patel
(74) *Attorney, Agent, or Firm*—Dykema Gossett PLLC

(57) ABSTRACT

Marine apparatus formed of equipment and at least one insulation assembly assembled therearound, the at least one insulation assembly circumferentially surrounding the equipment and including at least one shroud providing an impermeable enclosure filled with thermal insulation, the thermal insulation being totally enclosed by the shroud, the at least one insulation assembly being a discrete length. Multiple insulation assemblies can be adjoined end to end.

14 Claims, 6 Drawing Sheets

MARINE AND SUBMARINE PIPELINES

BACKGROUND OF THE INVENTION

1. Field of the Invention

This invention relates to improvements in marine, which includes submarine, apparatus, such as pipelines and associated equipment

2. The Prior Art

For the recovery of hydrocarbon from beneath the seabed, it has been necessary to install prefabricated pipelines within and between offshore oil and gas fields and onshore processing facilities.

To meet the need to install pipelines with a high degree of reliability, it is possible to use barges and vessels with several aligned welding, inspection and coating stations that can fabricate a pipeline from a large number of short lengths, typically 11 meters long. The welded joints of the pipeline have then to be inspected and coated before the pipeline is lowered to the seabed down and over a curved stinger or ramp. As an alternative, suitable for pipelines of smaller diameter, the pipelines will be fabricated into long lengths, which are then reeled onto a large drum or spool on board a vessel. The pipeline is unreeled from the vessel, straightened to remove the curvature created by the reeling process, and then lowered onto the seabed.

A further alternative is to fabricate, at a suitable shore site, a bundled assembly formed of a pipeline or group of pipelines housed within a large diameter outer steel pipeline, known as a carrier pipe. The void space within the carrier pipe and around the inner pipelines is sealed to prevent seawater ingress and to provide buoyancy. The bundled assembly is then towed from the shore site to the offshore site, where the carrier is then flooded.

In use, pipelines and associated equipment often need to be insulated to maintain temperatures of the fluid flowing within them. Thermal insulation of the equipment is currently provided by the application to the outside surface of the pipeline or equipment of one or a plurality of layers of suitable insulation material. These insulation materials are typically elastomers, which are applied to the pipeline by various processes including extrusion, impingement or wrapping.

A further alternative, where high levels of thermal insulation is required, is to house a pipeline within an outer sleeve pipe, the annulus between which is filled either totally or partially with insulation material. This method of providing thermal insulation, is known as a 'Pipe-in-Pipe' arrangement. The 'Pipe-in-Pipe' arrangement is particularly appropriate for installation in deep water and/or operation at high temperatures and pressures.

It is an objective of the present invention to provide a marine and submarine apparatus, including pipelines and associated equipment with an alternative form of high performance thermal insulation, which does not need to be housed within an outer sleeve Pipe-in-Pipe arrangement.

SUMMARY OF THE INVENTION

According to the invention there is provided thermal insulation for marine or submarine apparatus, typically a pipeline, comprising insulation material housed within a totally enclosing shroud. The totally enclosing shroud may be formed by casting the shroud around the pre-formed half shells of thermal insulation which are first secured to the pipeline. Alternatively the totally enclosing shroud is bonded or secured to the pipeline prior to filling it with thermal insulation. A further alternative is to provide thermal insulation by fabricating half shell shrouds which are themselves filled with thermal insulation material, the shrouded half shells are then either bonded or mechanically secured to the pipeline outer surface, to totally enclose the pipeline. The totally enclosing shroud or shrouded half shells are preformed in discrete lengths, 1.5 or 2 meters in length being appropriate to facilitate application. The shrouded shells may be produced by casting, rota-moulding or fabricated of preformed parts each produced typically by casting, rota-moulding, extrusion, injection moulding and the like. The shrouded shells may feature suitable end arrangements to abut, adjoin and lock together to form an elongate assembly of thermal insulation along part or the whole length of the pipeline.

It is common practice to weld together the short length (circa 12 m long) pipe joints to form what is termed double or quad joints or strings, comprising two and four pipe length respectively. For bundles and pipelines to be installed by reeling, the string length may extend to several kilometers. It is envisaged that it will often be the case that the thermal insulation half shells will be applied over the entire length of the strings, save a short distance at each end to facilitate welding (the field jointing) the pipe strings together to form the pipeline. Upon completion of the field joint it too will be thermally insulated. To achieve this a number of systems can be utilised, including ones based on the embodiments of this invention.

Whilst reference is made throughout this document to half shells, the shrouded thermal insulation assemblies may be formed as one or a plurality of assemblies, including but not limited to third or quarter shells by way of example, to circumscribe or surround the pipe.

It is understood that the term 'apparatus' refers to individual pieces of equipment, structures, pipelines, flow lines, conduits or combinations of the aforesaid and the like.

Preferred embodiments of the invention will now be described, by way of example only, with reference to the accompanying drawings.

DETAILED DESCRIPTION OF THE PREFERRED EMBODIMENTS

Figure 1:
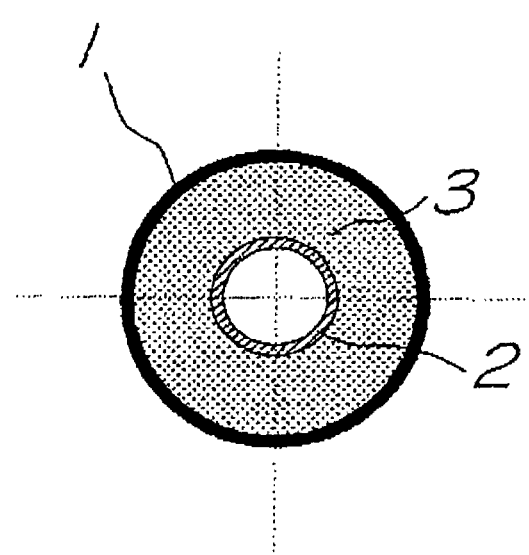
FIG. 1 is a cross section of a piece of underwater equipment according to the invention which is surrounded by thermal insulation housed within a discrete length enclosing shroud and as also illustrated in FIG. 9.

Referring to FIG. 1 there is shown an item of underwater equipment (2), such as a piece of pipeline, which is surrounded by thermal insulation (3) and an enclosing impermeable shroud (1). The thermal insulation (3) may be preformed of shells which are secured to the equipment (2) and around which is then cast the shroud (1). Alternatively the shroud (1) may be preformed, slid over the equipment (2), secured by bonding and/or mechanical means to the equipment (2), then filled with the thermal insulation (3) In all cases the thermal insulation is totally bounded by the equipment (2) and by the shroud both on its external cylindrical surface and end surfaces as illustrated with reference to FIG. 9. By way of example only, the thermal insulation may comprise blown polyurethane foams, mineral wool, microporous silica, microspheres as granular material or combined with a bonding agent, such as a resin or elastomer, to form a matrix material, where the interstitial voids around and between the microspheres are partially or totally filled with the bonding agent. Alternatively the thermal insulation may comprise a plurality of layers of any of the aforenamed insulation materials, in any combination and arrangement.

The length of the insulation assemblies can be typically anything up to around 12 m long.

Figure 2:
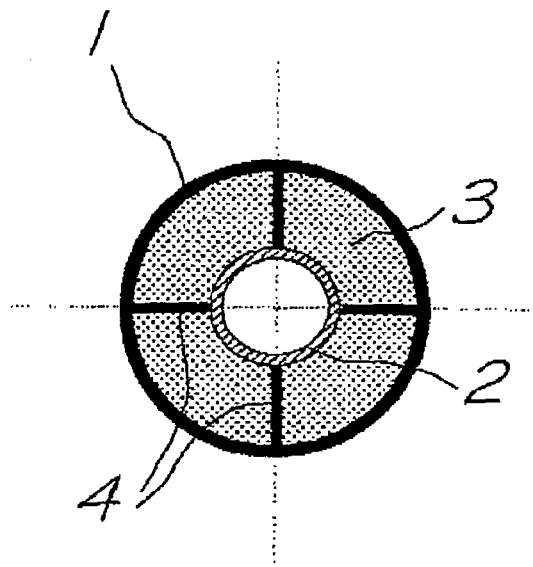
FIG. 2 is a cross section of a piece of underwater equipment as described above with reference to FIG. 1, which features a plurality of longitudinal bulkheads.

Referring to FIG. 2 there is shown an item of underwater equipment (2), which is surrounded by thermal insulation (3) and a enclosing impermeable shroud (1), all as particularly described above with reference to FIG. 1, which also features a plurality of longitudinal bulkheads (4). The bulkheads may be either positioned between the thermal insulation or formed when casting the enclosing shroud (1). The reference to bulkheads also includes webs.

Figure 3:
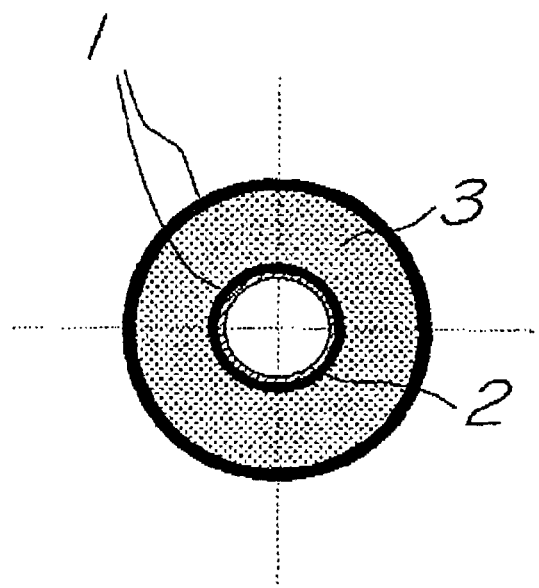
FIG. 3 is a cross section of a piece of underwater equipment according to the invention which is surrounded by thermal insulation housed within a discrete length of totally enclosing shroud and as also illustrated by FIG. 11.

Referring to FIG. 3 there is shown an item of underwater equipment (2), which is surrounded by thermal insulation (3) and a enclosing impermeable shroud (1), all as particularly described above with reference to FIG. 1, where the thermal insulation (3) is totally enclosed within the shroud, both around its external surfaces and in an annulus between the equipment (2) and thermal insulation (3), as also illustrated with reference to FIG. 11.

Figure 4:
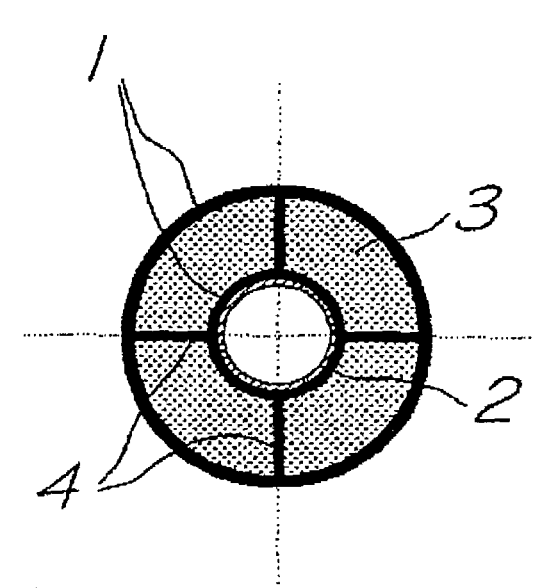
FIG. 4 is a cross section of a piece of underwater equipment as described above with reference to FIG. 3, which features a plurality of longitudinal bulkheads.

Referring to FIG. 4 there is shown an item of underwater equipment (2), which is surrounded by thermal insulation (3) and a enclosing impermeable shroud (1), all as particularly described above with reference to FIG. 3, which also features a plurality of longitudinal bulkheads (4). The bulkheads may be either positioned between the thermal insulation or formed when casting the enclosing shroud.

Figures 5, 6:
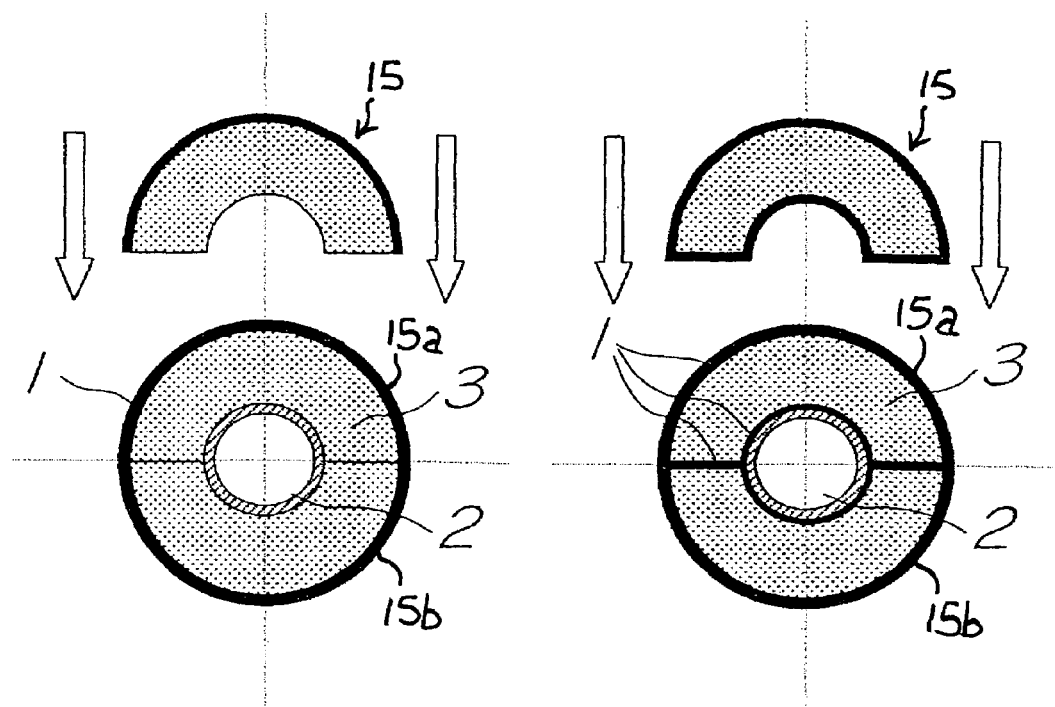
FIG. 5 is a cross section of a piece of underwater equipment according to the invention which may be surrounded by thermal insulation housed within two shrouded half shells and as also illustrated by FIG. 9.
FIG. 6 is a cross section of a piece of underwater equipment according to the invention as described above with reference to FIG. 5, where the thermal insulation is totally encapsulated within each halt shell itself, and as also illustrated by FIG. 11.

Referring to FIG. 5 there is shown an item of underwater equipment (2), to which is attached a pair (15a, 15b) of half shell (15) assemblies, each comprising an outer impermeable shroud (1) and containing thermal insulation (3). The thermal insulation may comprise blown polyurethane foams, mineral wool, microporous silica, microspheres as granular material or combined with a bonding agent to form a matrix material, where the interstitial voids around and between the microspheres is partially or totally filled with the bonding agent. Alternatively, the thermal insulation may comprise a plurality of layers of any of the aforenamed insulation materials, in any combination and arrangement. The shrouds (1) and/or thermal insulation (3) of the shells (15) are bonded together at their adjoining surfaces. The shrouds and shell (15) may also be bonded to the apparatus (2). In all cases the thermal insulation is totally bounded by the equipment (2) and by the shroud both on its external cylindrical surface (20) and end surfaces (21) as illustrated with reference to FIG. 9.

Figure 11:
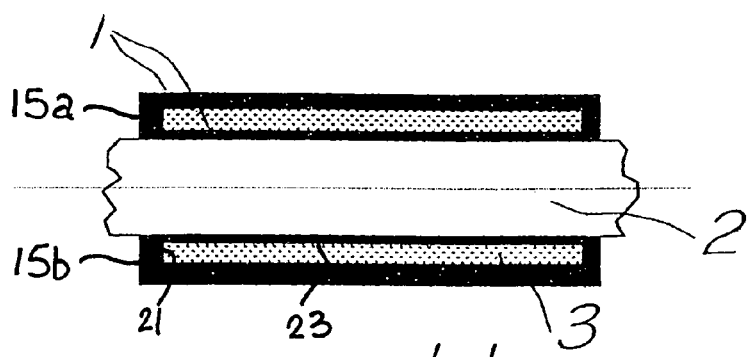
FIG. 11 is a side elevation of the piece of underwater apparatus described above with reference to FIGS. 3, 4, 6, and 8.

Referring to FIG. 6 there is shown an item of underwater equipment (2), which is surrounded by thermal insulation (3) and a enclosing impermeable shroud (1), all as particularly described above with reference to FIG. 5, but where the thermal insulation (3) is totally enclosed within the shroud, both around its external surfaces, between the equipment (2) and thermal insulation (3), its radial surfaces and its end surfaces also as illustrated by FIG. 11.

Figures 7, 8:
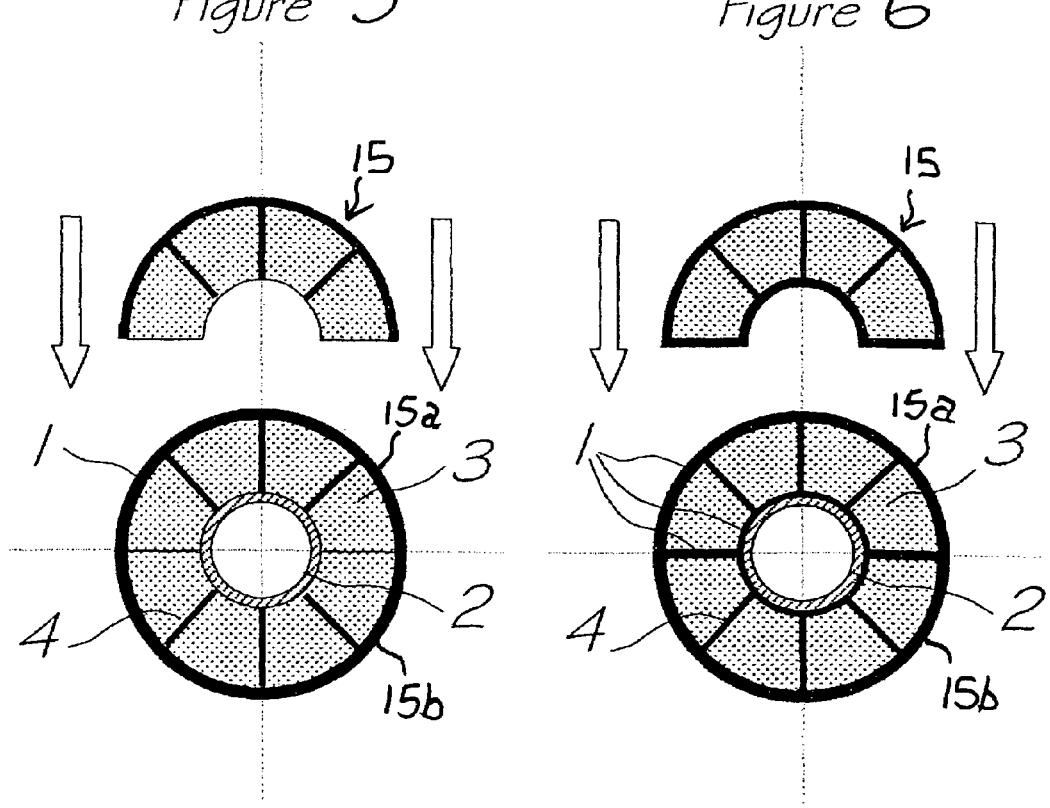
FIG. 7 is a cross section of a piece of underwater equipment according to the invention as described above with reference to FIG. 5, which features a plurality of longitudinal bulkheads.
FIG. 8 is a cross section of a piece of underwater equipment according to the invention as described above with reference to FIG. 6, which features a plurality of longitudinal bulkheads.

Referring to FIG. 7 there is shown an item of underwater equipment (2), which is surrounded by thermal insulation (3) and an enclosing impermeable shroud (1), all as particularly described above with reference to FIG. 5, which also features a plurality of longitudinal bulkheads (4). The bulkheads may be either preformed and positioned between the thermal insulation (3) or formed when casting the enclosing shroud, such that they become an integral part of the shroud.

Referring to FIG. 8 there is shown an item of underwater equipment (2), which is surrounded by thermal insulation (3) and an enclosing impermeable shroud (1), all as particularly described above with reference to FIG. 5, which also features a plurality of longitudinal bulkheads (4). The bulkheads may be either be preformed and positioned between the thermal insulation (3) or formed when casting the enclosing shroud, such that they become an integral part of the shroud.

Figure 9:
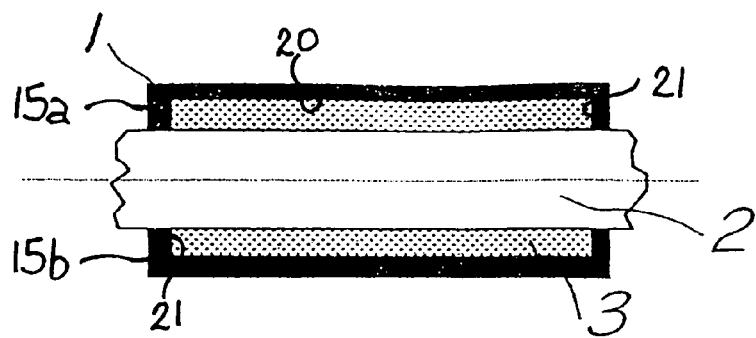
FIG. 9 is a side elevation of the piece of underwater apparatus described above with reference to FIGS. 1, 2, 5, and 7.

Referring to FIG. 9 there is shown an item of underwater equipment (2), which is surrounded by thermal insulation (3) as particularly described with reference to FIGS. 1, 2, 5 and 7, where the thermal insulation (3) extends from one end of the enclosing shroud to the other end of the shroud. In all cases the thermal insulation is totally bounded by the equipment (2) and by the shroud both on its external cylindrical surface (20) and end surfaces (21) as illustrated.

Figure 10:
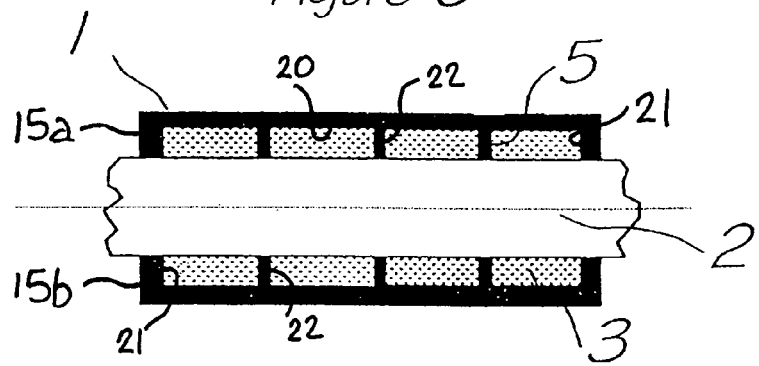
FIG. 10 is a side elevation of the piece of underwater apparatus described above with reference to FIGS. 1, 2, 5, 7 and 9, which features a plurality of circumferential bulkheads.

Referring to FIG. 10 there is shown an item of underwater equipment (2), which is surrounded by thermal insulation (3) as particularly described with reference to FIGS. 9, where the thermal insulation (3) comprises a plurality of discrete lengths between which are circumferential bulkheads (5). The bulkheads may be either be preformed and positioned between the thermal insulation (3) or formed when casting the enclosing shroud, such that they become an integral part of the shroud.

Referring to FIG. 11 there is shown an item of underwater equipment (2), which is surrounded by thermal insulation (3) as particularly described with reference to FIGS. 3, 4, 6, and 8, where the thermal insulation (3) is totally enclosed within the shroud, around its external surfaces (20), around its internal surfaces (23) between the equipment (2) and thermal insulation (3), and its end surfaces (21). The section of shroud (1) between the equipment (2) and the thermal insulation (3) may be completed before or as a consequence of its assembly onto the equipment (2). The formation of the section of shroud (1) between the equipment (2) after its assembly onto the equipment (2) thus extending the entire length of the shroud. The formation of the inner part of the shroud in this way may at the same time bond it into place onto the apparatus (2).

Figure 12:
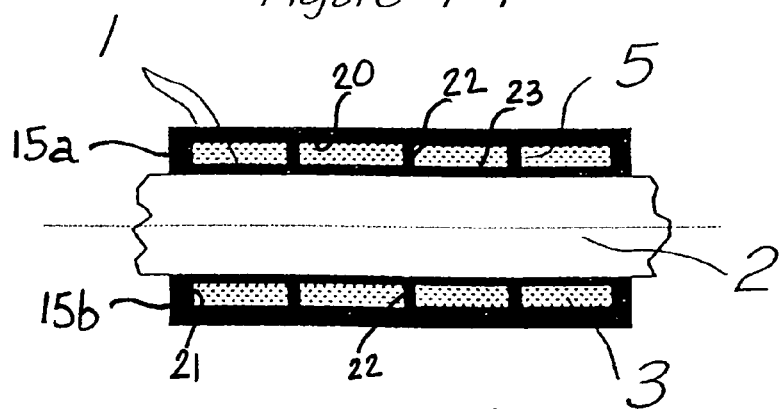
FIG. 12 is a side elevation of the piece of underwater apparatus described above with reference to FIGS. 3, 4, 6, 8 and 11, which features a plurality of circumferential bulkheads.

Referring to FIG. 12 there is shown an item of underwater equipment (2), which is surrounded by thermal insulation (3) as particularly described with reference to FIG. 11, where the thermal insulation (3) comprises a plurality of discrete lengths between which are circumferential bulkheads (5). The bulkheads may be either be preformed and positioned between the thermal insulation (3) or formed when casting the enclosing shroud, such that they become an integral part of the shroud.

Figure 13:
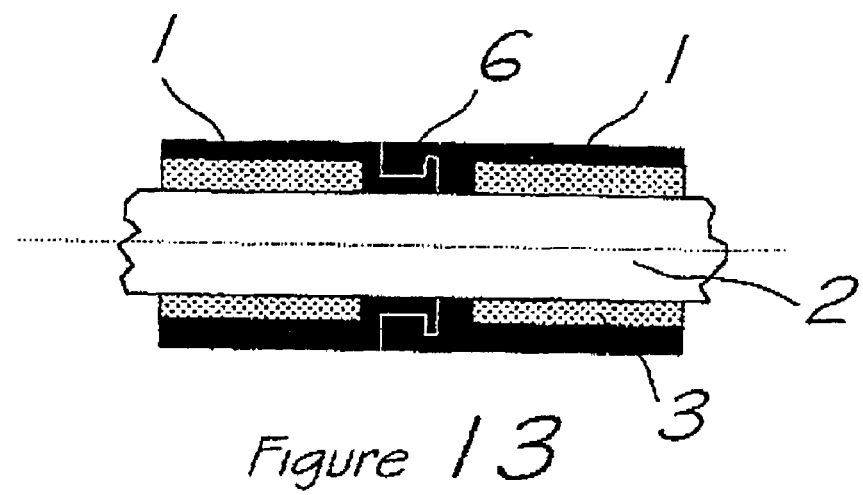
FIG. 13 is a cross section of either the piece of underwater equipment according to the invention and as described above with reference to FIGS. 1 through 12, showing typical abutting and adjoining discrete lengths of half shell shroud assemblies.

Referring to FIG. 13 there is shown an item of underwater equipment (2), which is surrounded by two shrouded thermal insulation elements as particularly described with reference to FIGS. 1 through 12 inclusive and shown adjoined at their ends and featuring a flanged arrangement. The method of joining the elements will depend on the requirements to transmit loads across the joints and may be formed as an integral part of the shroud. The configuration shown in FIG. 13 is only possible where the shroud is formed in shells (15) or sections. The joint may be completed by bonding together any number of its adjoining surfaces.

Figure 14:
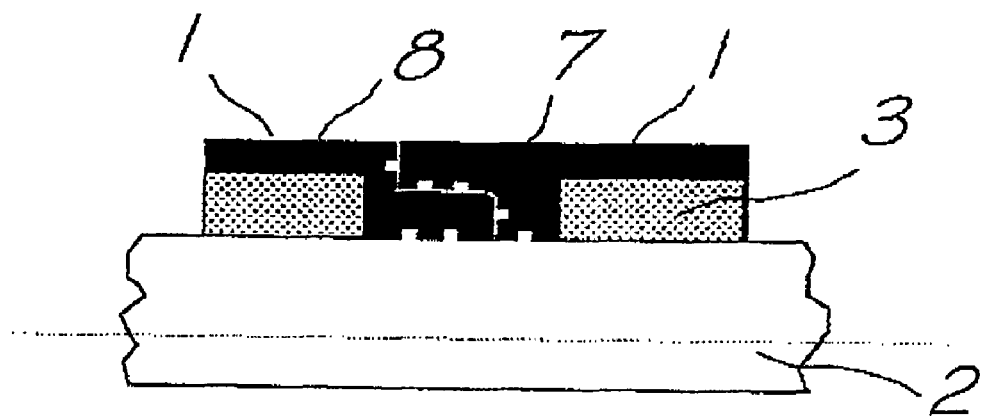
FIG. 14 is a cross section of either the piece of underwater equipment according to the invention and as described above with reference to FIGS. 1 through 12, showing typical abutting and adjoining discrete lengths of totally enclosing shroud assemblies, including those formed of half shell shrouds, featuring a spigot arrangement, in which the joint may be completed by bonding together any number of its adjoining surfaces and/or may feature one or a plurality of seals, typically 'O' rings.

Referring to FIG. 14 there is shown an item of underwater equipment (2), which is surrounded by two shrouded thermal insulation elements as particularly described with reference to FIGS. 1 through 12 inclusive and shown adjoined at their ends featuring a spigot arrangement. The method of joining the elements will depend on the requirements to transmit loads across the joints and is formed as an integral part of the shroud. The joint may be completed by bonding together any number of its adjoining surfaces and may additionally feature mechanical sealing devices such as 'O' rings between one or any number of its adjoining surfaces.

Figure 15:
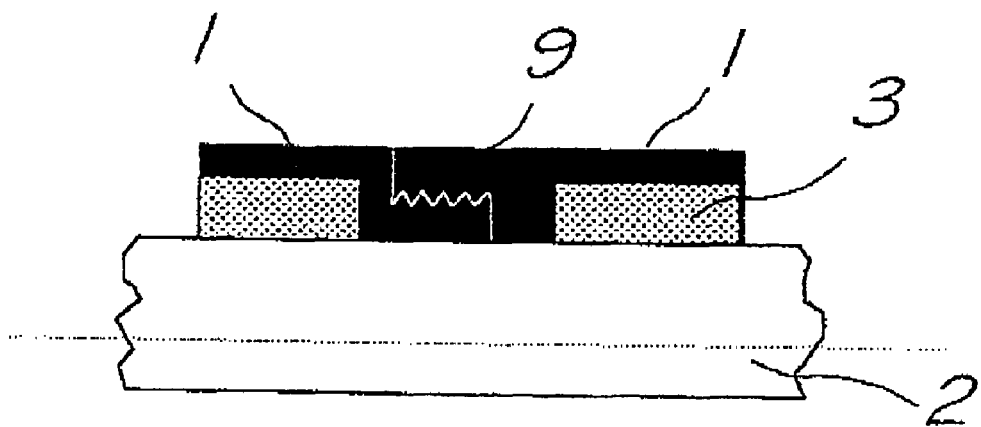
FIG. 15 is a cross section of either the piece of underwater equipment according to the invention and as described above with reference to FIGS. 1 through 12, showing typical abutting and adjoining discrete lengths of totally enclosing shroud assemblies, including those formed of half shell shrouds, featuring a screw thread arrangement, wherein the joint may be completed by bonding together any number of its adjoining surfaces.

Referring to FIG. 15 there is shown an item of underwater equipment (2), which is surrounded by two shrouded thermal insulation elements as particularly described with reference to FIGS. 1 through 12 inclusive and shown adjoined at their ends featuring a screw thread or similar arrangement. The method of joining the elements will depend on the requirements to transmit loads across the joints and is formed as an integral part of the shroud. The joint may be completed by bonding together any number of its adjoining surfaces.

Figure 16:
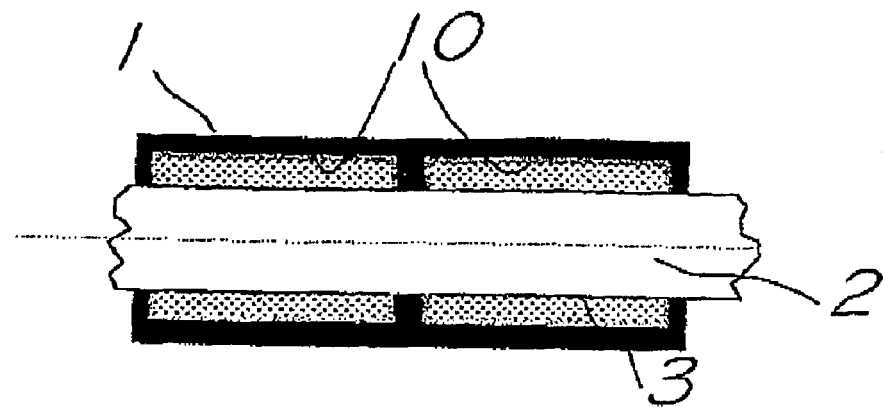
FIG. 16 is a side elevation of the piece of underwater apparatus described above with reference to FIG. 1 through 15 inclusive, which features thermal insulation encapsulated in its own thin membrane shroud.

Referring to FIG. 16 there is shown an item of underwater equipment (2), as particularly described with reference to FIGS. 9 through 12, where the thermal insulation (3) is itself either totally or partially encapsulated in a thin membrane shroud, typically formed of suitable elastomeric material.

Figure 17:
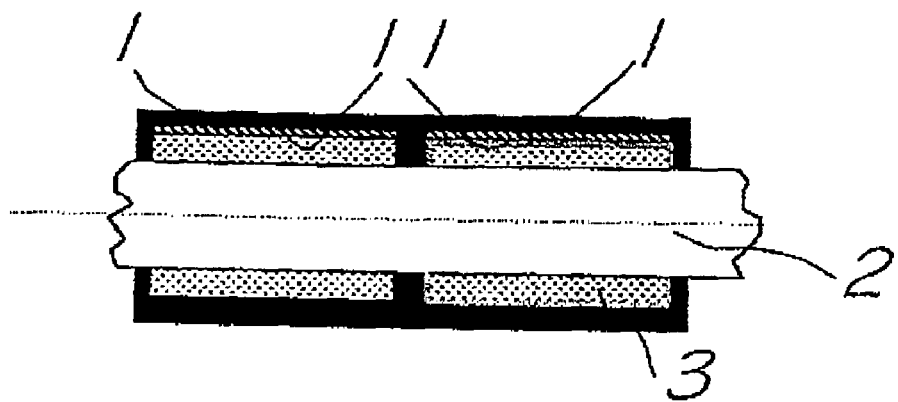
FIG. 17 is a side elevation of the piece of underwater apparatus described above with reference to FIG. 1 through 16 inclusive, which features stiffening or mass providing members incorporated between the thermal insulation and encapsulated thermal insulation, and beneath the outer most fabric of the shroud.

Referring to FIG. 17 there is shown an item of underwater equipment (2), as particularly described with reference to FIGS. 9 through 12 and FIG. 16, where the shrouded thermal insulation assembly additionally features a stiffening ring (11), the purpose of which is to provide structural stiffening to resist hydrostatic pressure induced forces when submerged, and/or to provide additional mass to counteract buoyancy forces resulting from the presence of the thermal insulation and shroud. The stiffening ring may typically be made of steel, other metals or of a elastomeric material, elastomeric material filled with heavy particulate material, typically iron ore or similar. Additionally the stiffening rings may each extend beyond the ends of the thermal insulation (3) into the shroud (1).

Figure 18:
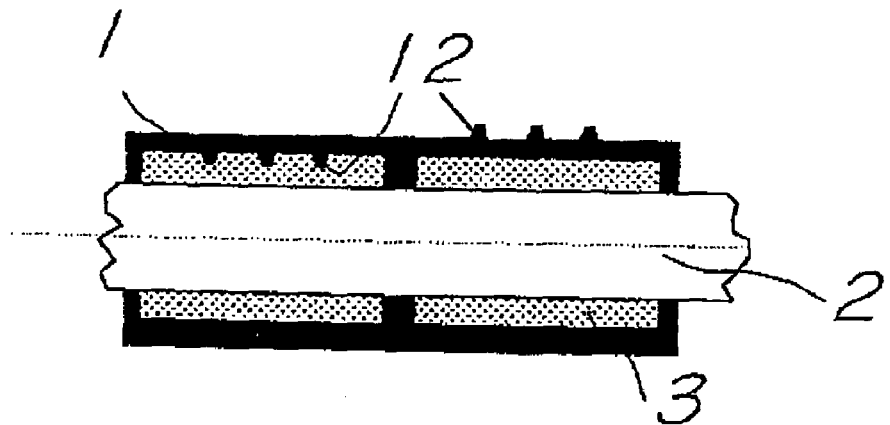
FIG. 18 is a side elevation of the piece of underwater apparatus described above with reference to FIG. 1 through 17 inclusive, which features integral stiffening webs formed as part of the shroud fabric.

Referring to FIG. 18 there is shown an item of underwater equipment (2), as particularly described with reference to FIGS. 1 through 17, where the shroud (1) has one or a number stiffening webs formed as an integral part of its external wall or fabric. The stiffening webs may be circumferential or longitudinal in orientation or a combination of both.

Figure 19:
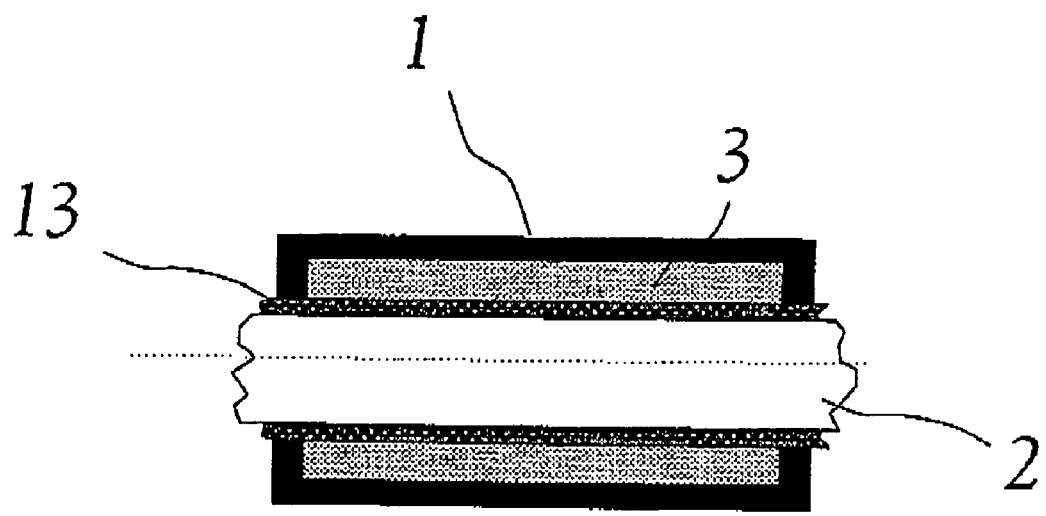
FIG. 19 is a side elevation of the piece of underwater apparatus described about with reference to FIGS. 1, 2, 5, 7, 9, 10, 13, 14, 15, 16, 17, and 18 which features mass providing members or material between the thermal insulation, ends of the shroud and the apparatus.

Referring to FIG. 19 there is shown an item of underwater equipment (2) as particularly described with reference to FIGS. 1, 2, 5, 7, 9, 10, 13, 14, 15, 16, 17, and 18 which additionally features mass providing members or material between the thermal insulation (3), ends of shroud (1) and the apparatus (2). The mass providing members or material may be steel, other metals, or of a elastomeric material, elastomeric material filled with heavy particulate material, typically iron ore or similar. The mass providing material may typically be in the form of shells, a spiral wrap or introduced into the annulus formed between the thermal insulation and ends of shroud following its or their assembly on to and around the equipment. Additionally the mass providing members or material may be bonded to the equipment, the thermal insulation, ends of shroud or all three.

Figure 20:
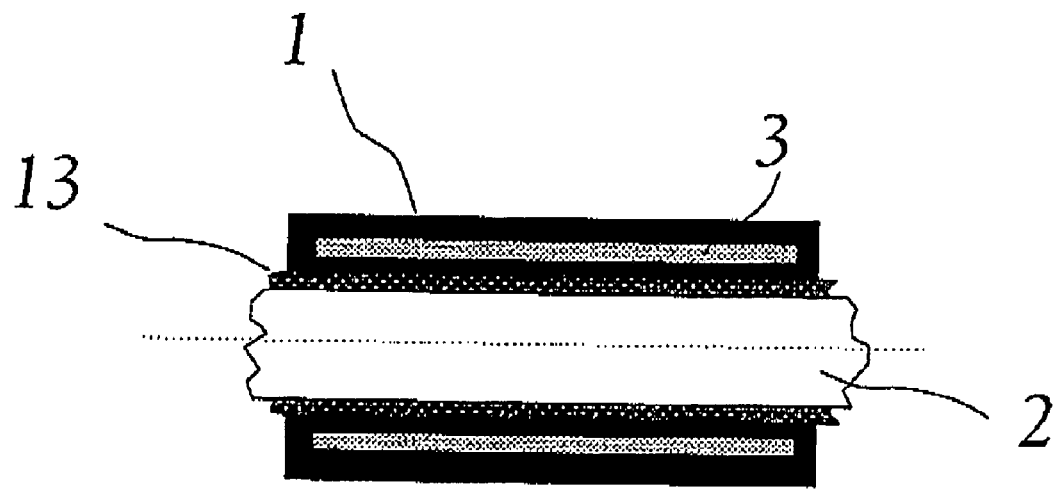
FIG. 20 is a side elevation of the piece of underwater apparatus described above with reference to FIGS. 3, 4, 6, 8, 11, 12, 13, 14, 15, 16, 17, and 18 which features mass providing members or material between the thermal insulation, inner surface of shroud and the apparatus.

Referring to FIG. 20 there is shown an item of underwater equipment (2) as particularly described with reference to FIGS. 3, 4, 6, 8, 11, 12, 13, 14, 15, 16, 17, and 18 which additionally features mass providing members or material between the thermal insulation (3), inner surface of shroud (1) and the apparatus (2). The mass providing members or material may be steel, other metals, or of a elastomeric material, elastomeric material filled with heavy particulate material, typically iron ore or similar. The mass providing material may typically be in the form of shells, a spiral wrap or introduced into the annulus formed between the thermal insulation and shroud inner surface following its or their assembly on to and around the equipment. Additionally the mass providing members or material may be bonded to the equipment, the thermal insulation, ends of shroud or all three.

The invention claimed is:

1. A marine or submarine apparatus comprising: underwater equipment, and a plurality of pairs of discrete half shell thermal insulation assemblies assembled around the equipment, each pair of said half shell assemblies being secured together to circumferentially surround the equipment and abutted or adjoined end-to-end to extend a total length or part thereof of the equipment, each of said half shell assemblies comprising an impermeable enclosing shroud and thermal insulation material totally enclosed within the impermeable enclosing shroud, said thermal insulation material defining external, internal and end surfaces and said enclosing shroud covering said external, internal and end surfaces.

2. The apparatus as claimed in claim 1, wherein the thermal insulation assemblies are bonded to an external surface of the equipment.

3. The apparatus as claimed in claim 1, wherein the assemblies are bonded at an interface surface with a circumferentially adjacent or neighboring assembly, as well as to the equipment.

4. The apparatus as claimed in claim 1, wherein each enclosing shroud is secured to the equipment by at least one of bonding and mechanical means.

5. The apparatus as claimed in claim 1, wherein the thermal insulation is bonded to each respective enclosing shroud.

6. The apparatus as claimed in claim 1, wherein the thermal insulation is formed of foamed polyurethane.

7. The apparatus as claimed in claim 1, wherein the thermal insulation is formed of mineral wool.

8. The apparatus as claimed in claim 1, wherein the thermal insulation is formed of microporous silica.

9. The apparatus as claimed in claim 1, wherein the thermal insulation is formed of hollow microspheres.

10. The apparatus as claimed in claim 9, wherein void space within the enclosing shroud and interstitial void space around and between the microspheres is filled or partially occupied with fine particle solids, a solid matrix, liquid, gas or vacuum.

11. The apparatus as claimed in claim 1, wherein a plurality of shrouded thermal insulation assemblies are adjoined and affixed by joint arrangements.

12. The apparatus as claimed in claim 11, wherein the joint arrangements between the shrouded assemblies comprise one or a plurality of seals.

13. The apparatus as claimed in claim 1, wherein the equipment is a elongate pipeline comprising a plurality of short lengths of pipe joined end-to-end by welding or mechanical means, the adjoined and affixed shrouded thermal insulation assemblies extending in length over the total or part length of the equipment.

14. The apparatus as claimed in claim 1, wherein the thermal insulation material in each half shell assembly defines a radial surface, and each enclosing shroud covers each radial surface.

\* \* \* \* \*